United States Patent [19]

Edgerton

[11] 4,280,416
[45] Jul. 28, 1981

[54] ROTARY VALVE FOR A REGENERATIVE THERMAL REACTOR

[76] Inventor: Philip Edgerton, 408 Swedesford Rd., Gwynedd Valley, Pa. 19437

[21] Appl. No.: 112,724

[22] Filed: Jan. 17, 1980

[51] Int. Cl.³ .................... F28D 17/00; F23G 7/06
[52] U.S. Cl. .................................... 110/254; 165/4; 165/7
[58] Field of Search .................. 165/7, 4, 5; 110/254

[56] References Cited

U.S. PATENT DOCUMENTS

| 1,970,534 | 8/1934 | Colby et al. ................... 165/7 X |
| 3,509,834 | 5/1970 | Rosenberg et al. ............ 165/7 X |
| 3,664,413 | 5/1972 | Bo ................................... 165/4 |
| 3,718,440 | 2/1973 | Foster-Pegg ................... 165/7 X |
| 4,126,419 | 11/1978 | Katabuchi et al. ............ 165/4 X |

Primary Examiner—Albert W. Davis

Attorney, Agent, or Firm—Robert E. Browne; Ralph R. Rath

[57] ABSTRACT

An apparatus for the elimination of fumes and odors from exhaust gases simultaneously with the recovery of heat from such gases and, in particular, a rotating control means for controlling the flow of such gases, in sequence, through heat exchange chambers and a central purification chamber of such apparatus wherein the gases are preheated and incinerated to remove fumes and odors. The apparatus has annular inlet, exhaust and purging ducts located adjacent a number of heat exchange chambers disposed adjacent a purification chamber. The flow of gases from and to the ducts through selected heat exchange chambers is maintained by a rotating control means disposed between the ducts and the heat exchange chambers.

9 Claims, 4 Drawing Figures

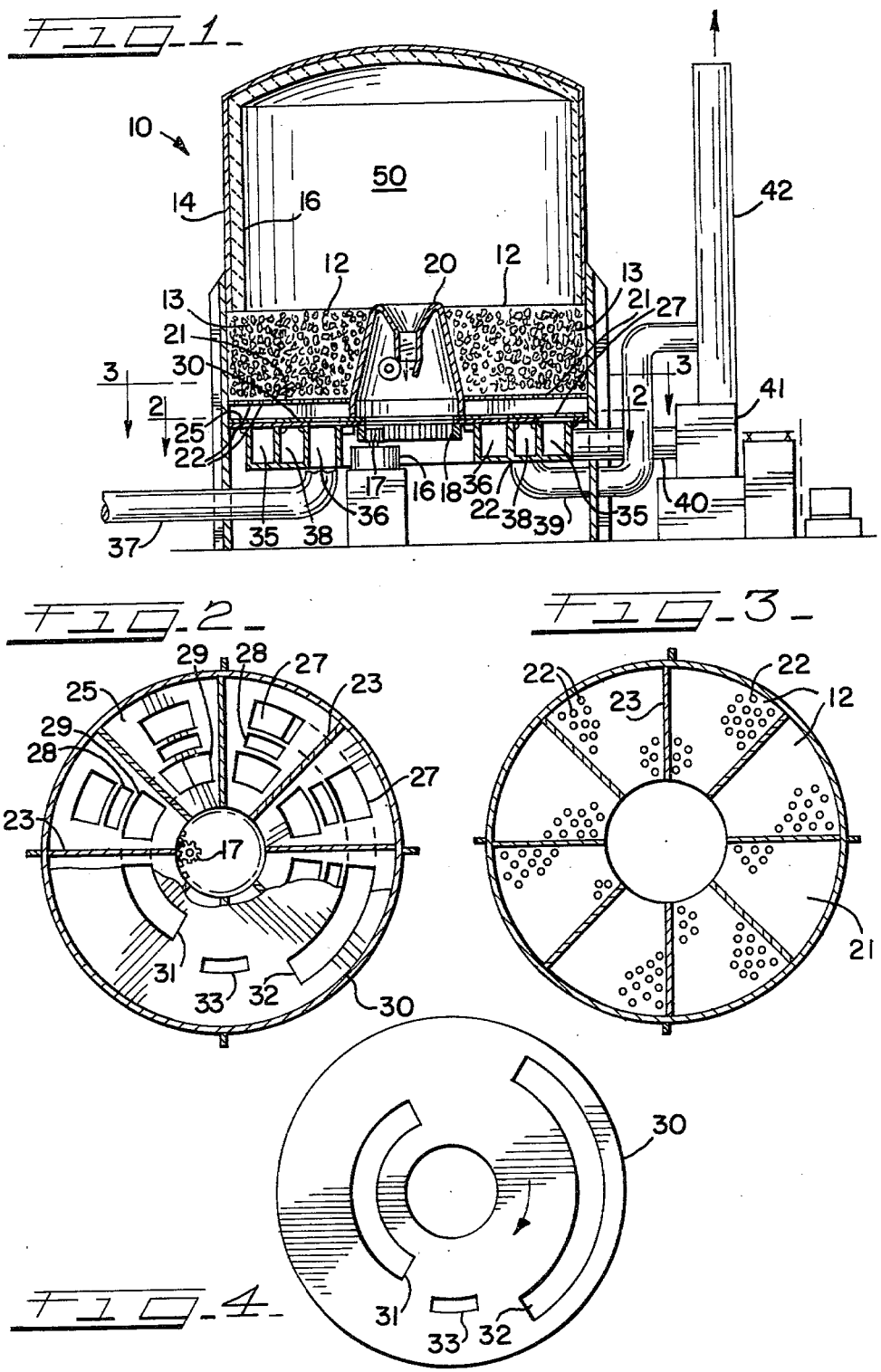

ROTARY VALVE FOR A REGENERATIVE THERMAL REACTOR

DESCRIPTION

1. Field of the Invention

This application relates to pollution and thermal control apparatus and, more particularly, to an apparatus for the elimination of fumes and odors from an exhaust system simultaneously with the efficient recovery of heat from the exhaust.

2. Background Prior Art

In recent years, both the control of pollution and the efficient conservation of energy have become an overriding concern of both industry and the general population. Previously, when fuel costs were low, it was more practical to incinerate fumes and odors in industrial exhaust, as it was and remains the most effective method of fume and odor control. However, during the present scracity of fossil fuels, such a method is not as attractive, primarily due to the high cost of fuel.

The response to the problem described above has been the development of apparatus which can oxidize or burn off pollutants using the principle of thermal regeneration. In such an apparatus, the exhaust gases or gas pollutants are drawn through a heat exchange bed having a plurality of discrete ceramic elements within. A number of these heat exchange chambers are in communication with a high temperature purification chamber. The passage of the pollutant gases is regulated through the heat exchange chambers so that alternate ones of the heat exchanger chamber serve as inlet zones to the purification chamber and subsequently as exit zones from the purification chamber. In this manner, the heat exchange chambers may serve as a preheating means for the pollutant gases and thereby require less heat to oxidize the pollutants in the gases in the purification chamber. An example of such an apparatus is described in U.S. Pat. No. 3,895,918. Such apparatus and other like pollutant gas control systems utilize valves for controlling the flow of the pollutant gas through the apparatus. Such valves are separated both in space and structure. Each valve was necessarily operated independently of other valves through a central controller often including electronic timers. Such system required a plurality of independent valve drive means for opening and closing each valve as well as the central control means for insuring that the valves were opened and closed in the correct sequence. Problems have arisen due to the unreliability of the central control, particularly the timers and valve drives, and high temperature differentials to which the valves are exposed. Such high temperature differentials can cause these valves to deform or warp, rendering them inoperative.

SUMMARY OF THE INVENTION

It is therefore an object of the subject invention to provide a pollutant control device which will effectively and efficiently eliminate pollutant gases in a waste effluent through the principle of thermal regeneration.

Another object of the subject invention is a rotary valve apparatus for use with a regenerative thermal reactor for controlling the entry and exit of pollutant gases into the thermal reactor.

A still further object of the subject invention is a simplified means of programming the entrance and exit of pollutant gases through a thermal reactor for cleansing the pollutant gases with minimal heat loss.

These and other objects are attained in accordance with the present invention wherein there is provided a regenerative thermal reactor having a rotary valve for the control and programming of the flow of the pollutant gases to and from the purifying or incineration chamber of the thermal reactor. Beneath the purifying chamber are heat exchange chambers where the incoming pollutant gases may be preheated prior to entry into the purification chamber and the outgoing cleansed gases are stripped of their heat and drawn from the apparatus for eventual exit to the atmosphere.

Controlling the entrance and exit of the gases through the heat exchange chambers are entrance and exit ports which are programmed by a rotary valve to continuously and automatically alternate the gas flow through the heat exchange chambers. The ports communicate with concentric, substantially circular ducts. One of the ducts leads the pollutant gases to the thermal reactor apparatus. Another duct provides an exit for the cleansed gases away from the thermal reactor apparatus, while yet another duct provides clean exhaust gas for purging the thermal reactor apparatus. A rotating flow control plate covers the respective ducts. Slots formed on the rotating plate allow communication of the purging, exhaust and inlet ducts with selective heat exchange chambers. The rotation of the rotating plate controls the flow of the gases through the heat exchange chamber through continuous cycling of the flow of the gases by first admitting pollutant gas to selected heat exchange chambers purging the heat exchange chambers and finally removing the incinerated gases through the heat exchange chambers to the atmosphere.

In this manner the heat exchange chambers are kept continuously hot by the incinerated gases flowing from the purification chamber to replace the heat lost to the pollutant gases in preheating. The cooled and cleansed gases exit the heat exchange chambers and pass through the exit port. From the exit port such gases are drawn out of the exit duct of the thermal reactor apparatus by an exhaust fan which pushes the cooled, cleansed gases out an appropriate exhaust stack.

BRIEF DESCRIPTION OF THE DRAWINGS

Further objects of the invention together with additional features contributing thereto and advantages accruing therefrom will be apparent from the following description of the embodiment of the invention when read in conjunction with the accompanying drawings wherein:

FIG. 1 is a cross-sectional view of one embodiment of the invention showing a thermal reactor.

FIG. 2 is a cross-sectional view taken along the lines 2—2 of FIG. 1 showing the inlet ports and exhaust port and partially cut away to show the rotating flow control plate.

FIG. 3 is a cross-sectional view taken along the lines 3—3 of FIG. 1 showing a perforated plate forming the bottom of the heat exchange chambers.

FIG. 4 is a top plan view taken along the lines 4—4 of FIG. 1 showing the rotating flow control plate for controlling the influx and exit of the pollutant gases through the thermal reactor of the subject invention.

DETAILED DESCRIPTION

Referring now to FIG. 1 there is shown a thermal reactor 10 having a purification chamber 50 encased by steel walls 14 and appropriate refractory insulation 16. At the bottom central portion of the purification chamber 50 is a burner or gas jet 20 for maintaining the purification chamber at a desired incinerating temperature, such as 1500° F. Temperature in the purification chamber may be controlled by appropriate thermostats and choice of fuel, all as known in the art.

Beneath the purification chamber are separate heat exchange chambers 12, which may contain the thermal contact elements 13 such as ceramic or metallic pieces to provide maximum contact with the gas flow while yielding minimal resistance to its flow. The heat exchange chambers 12 are shown in FIG. 3 as being eight in number, although a greater or lesser number of chambers may be utilized as desired. Each heat exchange chamber 12 is bounded by a perforated plate 21 on the lower portion for supporting the ceramic elements 13 within the heat exchange chamber 12. Perforations 22 are large enough to allow the flow of gas through the heat exchange chamber 12 but small enough to retain contact elements 13 in the chamber 12 above it. Each chamber 12 is separated from adjacent chambers by walls 23.

The exhaust gas enters the thermal reactor apparatus through inlet conduit 37. Inlet conduit 37 terminates at annular inlet duct 36. Concentric with inlet duct 36 is outlet duct 35 which is connected to the atmosphere through outlet conduit 40, exhaust fan 41 and chimney 42. A similar annular purging duct 38 is disposed between inlet duct 36 and outlet duct 35, and is connected through conduit 39 to the exhaust chimney 42. While inlet duct 36, purging duct 38 and outlet duct 35 are shown as being annular concentric rings, other shapes and conformations are possible. For instance, the rings may be polygonal in shape and may be reversed in position, as desired.

Each duct 35, 36 and 38 is generally u-shaped in configuration and opens upwardly and supports a flow control means which is mounted to the ducts 35, 36 and 38 for rotation about a common axis. This flow control means includes a flow control plate 30 shown in FIG. 4, having an annular inlet slot 31 allowing communication between the inlet duct and selected ones of the heat exchange chambers 12. Flow control plate 30 also has an annular outlet slot 32 which simultaneously establishes a flow path from the heat exchange chambers 12 to the outlet duct 35. A smaller slot 33 establishes a flow path for the clean exhaust gases from the blower exhaust 42 to a heat exchange chamber for purging prior to exhausting or removing the cleansed gases through that heat exchange chamber.

Mounted directly on flow control plate 30, as shown in FIG. 2, is stationary plate 25 which has ports 27, 28 and 29 for allowing flow into and out of each heat exchange chamber from inlet duct 36, purging duct 38, and outlet duct 35, when aligned with annular slots 31, 32 and 33 in flow control plate 30, respectively.

Inlet slot 31 on flow control plate 30 is preferably formed directly opposite the outlet slot 32 on flow control plate 30. When plate 30 allows the incoming gases to be channeled through the heat exchange chambers on one side of the thermal reactor apparatus 10, purified gases, after incineration in the purification chamber 50, will be exhausted through ports 27 on the opposite side of the thermal reactor apparatus. As plate 30 rotates, the oppositely disposed slots 31 and 32 will establish the flow of the gases through differential heat exchange chambers until the flow is essentially reversed when plate 30 has rotated 180°. The hot gases transfer most of their heat content to the thermal elements 12 in the heat exchange chamber, reducing the heat input to the combustion chamber and lowering the temperature of the outgoing exhaust gases. As the leading edge of inlet slot 31 comes into communication with the heat exchange chamber 12 only recently heated, it allows for the flow of unpurified gas into said chamber, thereby preheating such incoming gases prior to their entrance into the purification chamber.

To insure that no lingering pollutant gases within a heat exchange chamber are exhausted to the atmosphere when initial contact with exhaust ports 27 is made by exhaust slot 32, a purging slot 33 is formed in control plate between exhaust slot 32 and inlet slot 31 in the cycle of flow control plate 30. Purging slot 33 opens to purging port 28 and establishes the flow of clean exhaust air through the chamber into the incineration chamber 50, purging it of pollutants prior to establishing an exhaust flow by contact with exhaust slot 32.

Plate 30 of the subject invention is rotated by drive means 16 powering a pinion gear 17 engaged with a circular rack gear 18 secured to the underside of plate 30. Any other suitable drive means may be utilized for rotating each plate 30 in a continuous manner. The speed of rotation is preferably 10 revolutions per hour, however, the speed of plate 30 would be largely dependent upon the thermal characteristics of the incoming exhaust, as well as the nature of the pollutants carried by the exhaust, and would be increased or diminished according to such characteristics.

Other means of controlling the flow of gases through the heat exchange chambers may also be used. For example, damper valves could be mounted in ports 27, 28 and 29 with their axes positioned radially and operating shafts extending inward to a rotating cam plate, which would open and close the valves consecutively on rotation.

Another embodiment of the apparatus contemplated as within the scope of the subject invention would include vertically stacked ducts 35, 36 and 38. The flow of the gases would be controlled in this embodiment by a rotating cylinder establishing flow paths through appropriate slots in the cylinder itself and ports in an inner-wall of a segmented annular flue that would be concentric with the ducts. In either embodiment, the rotating flow control means provides unique and distinct advantages in reliability and operation over present control means.

While the invention has been described with reference to preferred embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

I claim:

1. A thermal reactor apparatus for purifying pollutant gases by incineration, said thermal reactor apparatus comprising an incineration chamber, a plurality of heat exchange chambers adjacent said incineration chamber, concentric substantially annular inlet and exhaust ducts, each of said inlet duct and said outlet duct mounted for communication with each of said heat exchange chambers, flow control means mounted adjacent said annular ducts, openings formed in said flow control means for providing a first flow path between a first heat exchange chamber and said inlet duct and a second flow path between a second heat exchange chamber and said outlet duct, said second heat exchange chamber being non-adjacent said first heat exchange chamber, said flow control means being rotatable for establishing said first and second flow paths through consecutive heat exchange chambers and thereby alternately heating one of said heat exchange chambers with effluent from said incineration chamber and then cooling said heat exchange chamber by the absorption of the heat in preheating said incoming pollutant gases prior to entry to said incineration chamber.

2. The thermal reactor apparatus of claim 1 wherein said heat exchange chambers are mounted beneath said incineration chamber in a radial manner.

3. The thermal reactor apparatus of claim 1 wherein said heat exchange chambers have a plurality of thermal transfer elements for maximum contact with the pollutant gas flowing thereover while yielding minimal resistance to the flow of said gas.

4. The thermal reactor apparatus of claim 1 wherein said openings in said flow control plate comprise annular slots.

5. The thermal reactor apparatus of claim 4 wherein said annular slots allow the simultaneous passage of said gas flow through more than one heat exchange chamber.

6. The thermal reactor apparatus of claim 1 further including a stationary plate mounted between said flow control means and said heat exchange chambers, said stationary plate having inlet ports and outlet ports for establishing said flow paths into said heat exchange chambers.

7. The thermal reactor apparatus of claim 1 wherein said reactor also includes a purging duct concentric with said inlet and exhaust ducts and carrying clean exhaust air and said flow control means includes an opening therein for selective communication of said purging duct with certain of said heat exchange chambers to purge remaining pollutant gases from said chambers prior to exhaust of incinerated gases therethrough.

8. A thermal regenerative pollution control apparatus having a plurality of adjacent heat exchange chambers mounted adjacent a purification chamber, an inlet conduit and an exhaust conduit, and a valve for controlling the flow of pollution, said valve comprising a stationary plate, a rotating plate and a drive means, said stationary plate having a plurality of inlet and exhaust ports formed therein to provide for communication of selected ones of said heat exchange chambers with said inlet conduit through an associated inlet port and with said exhaust conduits through an associated exhaust port, said rotating plate having an inlet opening for communication of a first heat exchange chamber with said inlet conduit through the associated inlet port and an exhaust opening for communication of a second heat exchange chamber with said exhaust conduit through the associated exhaust port, said first heat exchange chamber being nonadjacent to said second heat exchange chambers, whereby when said rotating plate is rotated by said drive means it acts to automatically control the flow of pollutant gases into said purification chamber from said first heat exchange chamber for preheating of said gases and into said second heat exchange chamber for cooling of the effluent gases prior to transfer into the atmosphere.

9. The apparatus of claim 8 wherein said stationary plate and said rotating plate have corresponding purging ports formed therein, said purging port being located on said rotating plate such that a purging duct carrying clean exhaust air may be placed in communication with said heat exchange chambers to prevent polluted gases from being exhausted to the atmosphere.

* * * * *